Oct. 23, 1956  R. L. ESKEN  2,767,477
GAUGING DEVICE
Filed Nov. 19, 1954  2 Sheets-Sheet 1
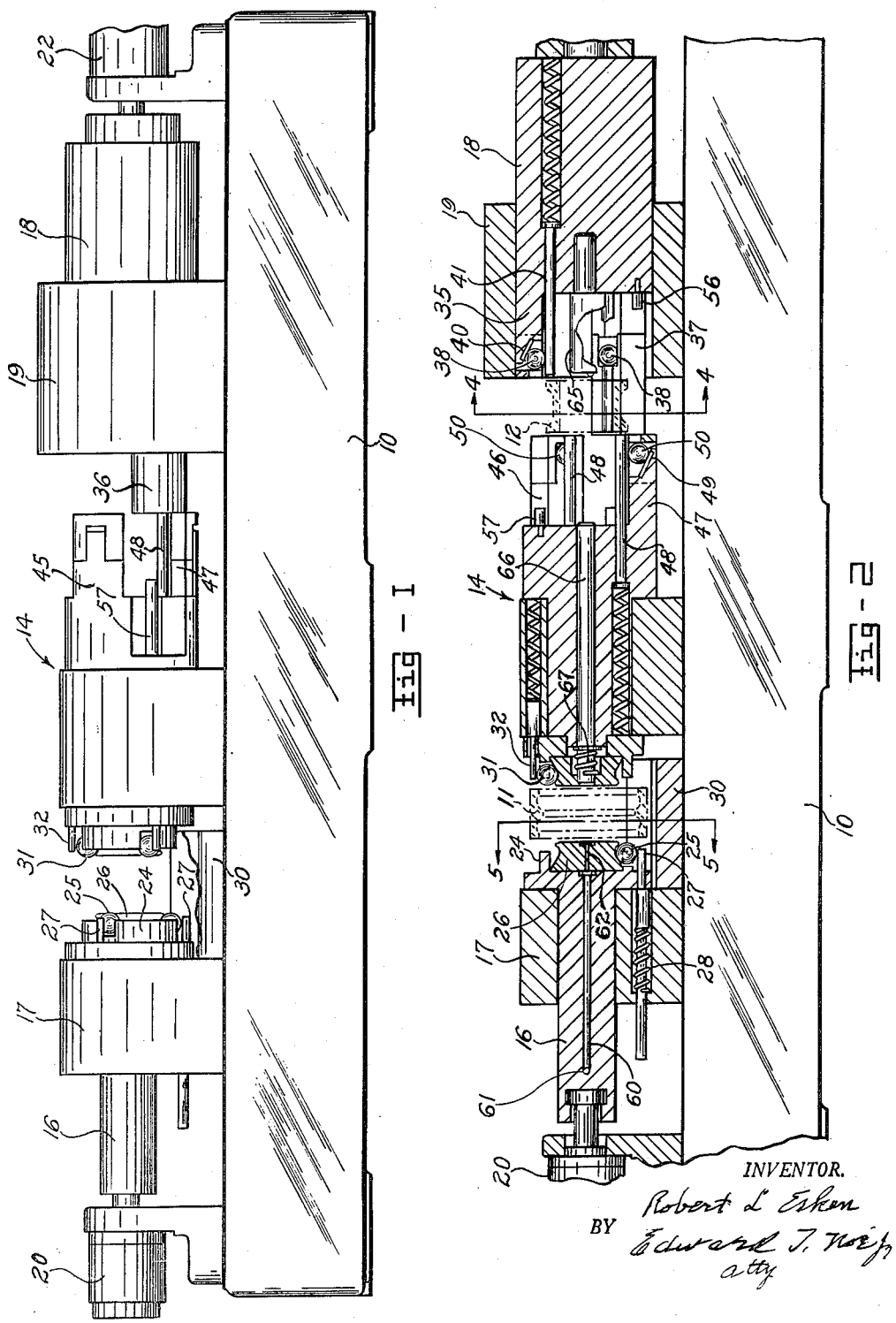
INVENTOR.
Robert L. Esken
BY Edward T. Noe
atty Oct. 23, 1956
R. L. ESKEN
2,767,477
GAUGING DEVICE
Filed Nov. 19, 1954
2 Sheets-Sheet 2
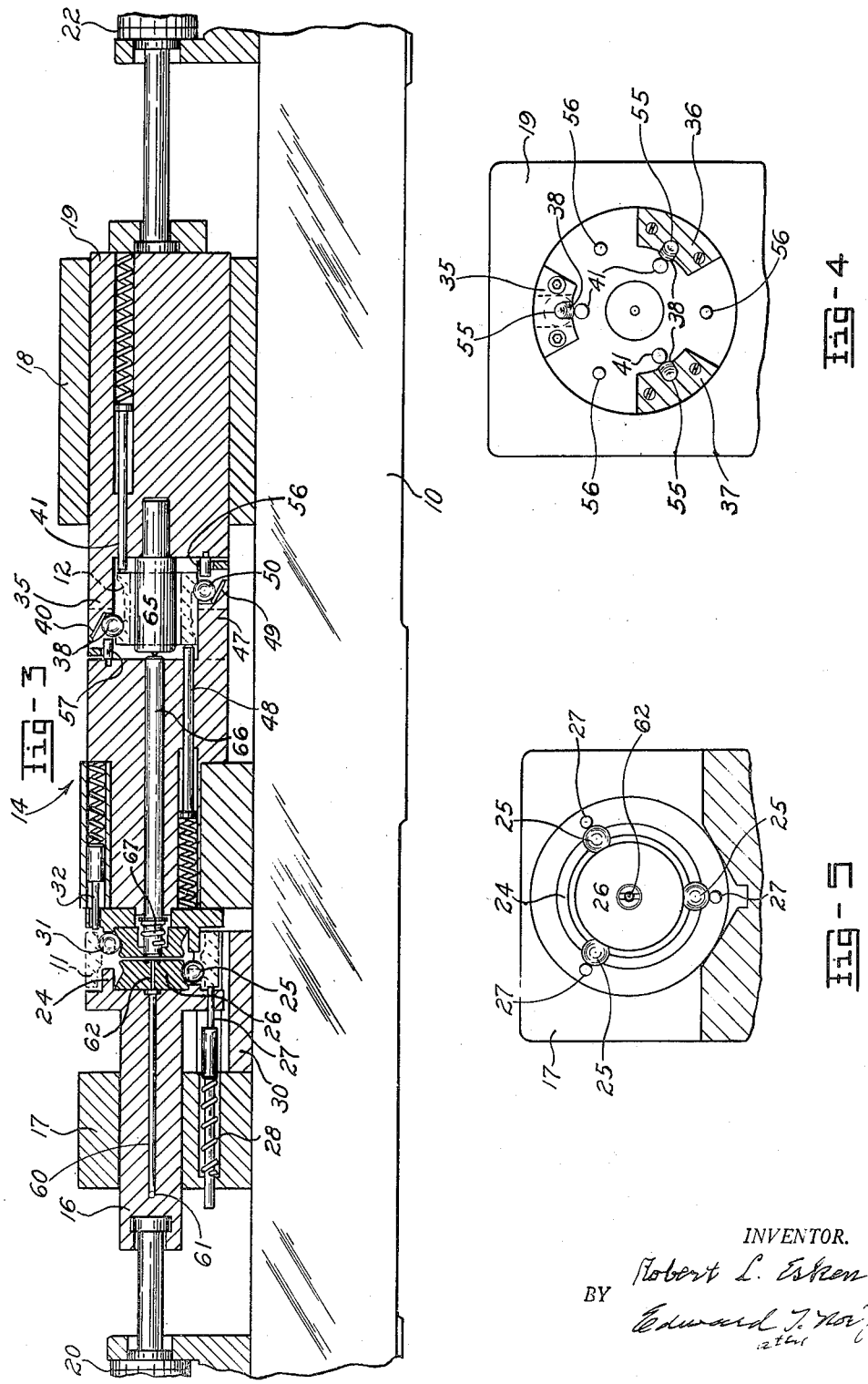
INVENTOR.
Robert L. Esken
BY
Edward T. Noix United States Patent Office 2,767,477
Patented Oct. 23, 1956

2,767,477

GAUGING DEVICE

Robert L. Esken, Dayton, Ohio, assignor to The Sheffield Corporation, Dayton, Ohio, a corporation of Ohio Application November 19, 1954, Serial No. 469,940

19 Claims. (Cl. 33—174)

This invention relates to a gauging apparatus and more particularly to an apparatus for gauging the mean ball space between the raceways of a double-row ball bearing having inner and outer raceways characterized by intersecting contact angles.

It is an object of this invention to provide an apparatus for accurately and rapidly gauging the characteristics of the races of a double-row ball bearing whereby the mean ball space between the two cooperating pairs of raceways can be determined, allowing the selection of the proper size bearing balls with assurance that the assembled bearing will meet the required operating tolerances.

It is a further object of this invention to provide such an apparatus wherein locating means engage and cooperate between one pair of bearing raceways to relatively locate the bearing races in accordance with the dimensional characteristics of the engaged raceways and gauging means are provided for engagement with the other pair of bearing raceways and respond to the dimensional characteristics of the inner and outer raceways and the respective axial spacing between each pair of raceways, whereby the mean ball space between the raceways is determined.

It is a further object to provide such a gauging apparatus wherein the gauging means comprises a fluid leakage orifice connected to a suitable gauging means and positioned in accordance with the disposition of one of the bearing raceways and an opposed orifice controlling surface positioned by the other, whereby the flow through the leakage orifice is controlled in accordance with the raceway characteristics.

It is a further object to provide gauging contacts for engagement with the bearing raceways at the nominal contact angle, the gauging contacts comprising freely rotatable bearing balls, and to provide retaining means for the gauging balls retaining the balls when the apparatus is inactive in gauging and allowing the rotatable extension of the balls into gauging contact with the bearing raceways.

Other objects and advantages of the invention will be apparent from the following description, the appended claims and the accompanying drawings, in which, Figure 1 is a longitudinal view in elevation of an apparatus embodying the present invention, Figure 2 is a longitudinal central section of the apparatus in a loading position, prior to gauging, Figure 3 is a similar view showing the apparatus as its components are positioned during gauging, Figure 4 is a sectional view on line 4—4 of Figure 2, and Figure 5 is a sectional view on line 5—5 of Figure 2.

The apparatus of the present invention is provided for rapidly and accurately gauging, prior to assembly, the mean ball space between the two pairs of raceways of a double-raw ball bearing. It is especially adapted for gauging the mean ball space between the raceways of a double-row ball bearing having a pair of inner raceways and a pair of outer raceways forming inner and outer races characterized by intersecting contact angles. In the illustrated application the races are integrally formed. It will be appreciated that while a specific apparatus has been illustrated and is shown as applied to the gauging of such bearing characteristics, this invention would not be limited to such a particular structure and would have application to gauging other similar product characteristics.

In gauging raceway characteristics through application of this invention, a locating means is interposed between a first cooperating pair of bearing raceways to space the races in accordance with the dimensional characteristics of this first pair of raceways. Gauging means are brought into positioning engagement with the other raceways of the inner and outer races respectively and the relative disposition of the gauging means when so positioned is gauged. The relative disposition of the gauging means will be determined by the dimensional characteristics of the raceways and by the axial spacing or "straddle" of each pair of inner and outer raceways. These are the raceway characteristics which determine the mean ball space between the raceways and the necessary size or classification of balls to be assembled with the particular gauged inner and outer races.

In order to insure accurate gauging in the illustrated apparatus the raceways are engaged by freely rotatable balls of nominal size urged into engagement with the raceways at the nominal contact angle. By providing freely rotatable balls as gauging contacts, the same points on the balls are not consistently contacted in gauging and a longer wear life is assured. The use of special gauging contacts is also avoided and a plentiful supply for ready substitution is available from the manufactured bearing components.

In the particular apparatus illustrated a base 10 supports all gauging components in axial alignment along its upper surface. The outer bearing race 11 and inner bearing race 12 are loaded for gauging into coaxial, relatively spaced positions as shown in Figure 2. A locating unit 14 is held in fixed position on the upper surface of the base 10 between the inner end faces of the bearing races. This locating unit includes freely rotatable ball contacts at its lefthand end as viewed in Figure 2 for engagement with the inwardly disposed raceway of the outer race 11 and at its righthand end has freely rotatable ball contacts for engagement with the outwardly disposed raceway of the inner race 12 to relatively locate the races.

At the lefthand end of the apparatus a first gauging component 16 is axially slidable in a carrier 17 mounted on the base 10. The first gauging component has freely rotatable ball contacts which are provided for engagement with the outwardly disposed raceway of the outer race 11. A second gauging component 18 is also carried for axial sliding in a carrier 19 and has freely rotatable ball contacts at its lefthand end for engagement with the inwardly disposed raceway of the inner race 12.

The first and second gauging components 16 and 18 are actuated by air cylinders 20 and 22. When these air cylinders 20 and 22 are energized to move the first and second gauging components inwardly the bearing races are carried toward one another to relatively limited positions as determined by the ball contacts of the locating unit 14. The inward movement of the gauging components continue until they are stopped by the engagement of the ball contacts with the respective bearing raceways.

The lefthand gauging component 16 comprises three freely rotatable ball contacts 25 which are carried in a groove formed in the outer surface of an annular member 26. The inner groove surface is perpendicular to the nominal contact angle. The ball contacts 25 are spaced about the axis of component 16 by seating in notches of an annular extension 24 of this component. The grooves and notches cooperate to form ball receiving pockets. The balls 25 are further retained in position when the apparatus is inactive in gauging by retractable pins 27, one being provided for each of the balls 25 allowing the individual removal and replacement of each ball as desired. Each of these retaining pins 27 is urged outwardly by a spring means as indicated at 28 for the lowermost pin. When the apparatus is expanded and inactive in gauging as shown in Figure 2, these pins retain the contacting balls but when the first and second gauging components are moved inwardly the pins 27 engage the adjacent end face of the outer race 11 and are forced inward and retracted to allow the extension of the gauging balls 25 into engagement with the outer raceway of the outer race.

The outer race 11 is loaded for gauging onto a V-block 30 mounted on the upper surface of base 10. When carried by the V-block 30 the outer race 11 is situated between the gauging balls 25 of the first gauging component 16 and the balls 31 at the lefthand end of locating unit 14. The balls 31 are retained in the locating unit 14 in a manner similar to the retaining structure provided for balls 25 in the first gauging component 16. Retaining plungers 32 are spring loaded to retain the balls 31 and retract upon engagement with the inner end face of the outer race 11 to allow balls 31 to engage the righthand or inwardly disposed raceway of the outer race 11.

The second gauging component 18 includes three projecting gauging fingers 35, 36 and 37. The lowermost pair of these fingers 36 and 37 are extended as viewed in Figures 1 to 3 to form a support for the inner race 12 when it is loaded for gauging. Each of the gauging fingers 35 to 37 carries a freely rotatable ball contact indicated at 38.

The gauging balls 38 are retained in pockets formed in the gauging fingers of the first gauging component 18. Each of the pockets has an inclined inner surface as indicated at 40 for the upper finger 35 and this surface serves to carry the gauging balls 38 into engagement with the inwardly disposed raceway of the inner race 12. The inclined inner surface is in each instance peripendicular to the nominal contact angle. The balls 38 are retained in these pockets by spring loaded plungers 41 which retract upon engagement with the outwardly disposed end face of the inner race 12 to allow extension of the gauging balls 38 across the raceway into engagement with the inwardly disposed inner raceway.

Three gauging fingers 45, 46 and 47 are provided at the righthand end of the unit 14 and these fingers mesh between the fingers 35, 36 and 37 of the second gauging component 18 when this component moves inwardly. Each of the gauging fingers of the spacing unit 14 carries a rotatable ball contact 50 retained inwardly by a retractable finger 48 and cammed into engagement with the outwardly disposed raceway of the inner race by an inclined cam surface 49 in a manner identical to that for engaging balls 38 carried by the second gauging component 18.

After the inner and outer bearing races 11 and 12 have been loaded into positions as seen in Figure 2, air cylinders 20 and 22 are energized to simultaneously move the first gauging component 16 and second gauging component 18 inwardly. Upon engagement of the balls 25 of the first gauging component 16 with a bearing raceway the race 11 is slid along the V-block 30 until the balls 31 at the lefthand end of the locating unit 14 stop its inward movement. Simultaneously the balls 38 carried by the second gauging component 18 are carried within the deeper portions of the pockets and across the adjacent raceway flange to engage the inwardly disposed raceway of the inner race 12 and the gauging fingers of the locating unit 15 and the second gauging component 18 intermesh until the inward movement of component 18 is stopped and the balls 50 of the locating unit 14 firmly engage the outwardly disposed raceway of the inner race 12.

The outer ends of the gauging fingers 35, 36 and 37 have openings or slots as indicated at 55. Similar openings or slots are provided at the outer end of the gauging fingers 46, 47 and 48 at the righthand end of the locating unit 14. As the second gauging component 18 approaches its inward limit of movement, plungers are indicated at 56 on component 18, and 57 at the righthand end of unit 14, enter the opposing slots and are positioned to engage the gauging balls restricting them to the shallow pocket portions to insure that they engage the raceways and prevent them from overriding the ends of the inner race 12.

The ball space in a double-row ball bearing is determined by the diameter of each raceway as measured across the center of the respective race, the radius of each raceway, and by the axial spacing or "straddle" of the inner and of the outer raceways.

Because cooperating raceways of the outer race 11 and inner race 12 are respectively engaged by balls 31 and balls 50 urged into engagement with the raceways by the inclined inner surfaces of the ball receiving pockets at each end of the locating unit 14 the races themselves will each be positioned with respect to the stationary body of locating unit 14 in accordance with the dimensional characteristics of their respective engaged raceways. For example, with a large diameter of the inward raceway of outer race 11, the balls 31 will assume positions in gauging which are radially further outward along the inclined surfaces of the ball receiving pockets and the race will be bodily positioned further to the right as viewed in Figure 3. Accordingly the races 11 and 12 will be relatively positioned in accordance with the dimensional characteristics of the pair of raceways engaged by the balls of locating unit 14. The inward position of the second gauging component 18 will as a result be determined by the dimensional characteristics of both inner raceways and by the axial spacing between this pair of raceways. The inward position of the first gauging component 16 will be similarly limited in accordance with the same characteristics of the outer raceways.

Gauging component 16 has a passage 60 passing centrally therealong. At one end 61 this passage is adapted for connection with a source of air under pressure and an air gauge and at the other end a leakage orifice is provided at 62 disposed centrally in the outer face of member 26. This leakage orifice will be positioned by the first gauging component 16 which carries it. Gauging component 18 carries a cylindrical projection 65 which engages the righthand end of a rod 66 carried for axial sliding in unit 14. This rod 66 is spring loaded by spring 67 against projection 65 and its lefthand end forms an opposed orifice controlling surface cooperating with orifice 62 to control the flow therefrom in accordance with the position of projection 65 and component 18. The resulting flow through the orifice 62 will be determined by the cooperating dimensions of both races and the mean ball space between the two cooperating pairs of raceways. An instrument through which flow from the source passes to orifice 62 will measure the flow out of the orifice. The instrument can be calibrated for this measurement in terms of a size of balls to be assembled with these gauged bearing races or to indicate ball classifications from which suitable balls can be selected.

Ordinarily the size of the balls in the gauge will correspond to the ordinary nominal size for which the races are intended. However, if for example, it is known that the ball space is consistently larger than normal in a group of races to be gauged, larger nominal size gauging balls can be used. Similarly the nominal contact angle can be varied to be proper for particular gauging situations.

It will thus be seen that a gauging device has been provided which gives precision measurements that can be relied on over a long service life. The device is responsive to those interrelated dimensional factors necessary in determining, prior to assembly, those components which when assembled together will meet required tolerances.

While the form of apparatus herein described constitutes a preferred embodiment of the invention, it is to be understood that the invention is not limited to this precise form of apparatus, and that changes may be made therein without departing from the scope of the invention which is defined in the apended claims.

What is claimed is:

1. An apparatus for gauging the mean ball space between the raceways of a double row ball bearing having a pair of relatively fixed inner raceways and a pair of relatively fixed outer raceways and characterized by intersecting contact angles, said apparatus comprising a base, means carried from said base for engagement with one raceway of an outer race and a cooperating raceway of an inner race to locate the engaged raceways one with respect to the other in gauging position, a first gauging component carried from said base for engaging the other raceway of the inner race and positioned thereby, a second gauging component carried from said base for engaging the other raceway of the outer race and positioned thereby, and gauging means cooperating between the first and second gauging components responsive to their relative positions when in engagement with the bearing raceways.

2. An apparatus for gauging the mean ball space between the raceways of a double-row ball bearing having a pair of relatively fixed inner raceways, and a pair of relatively fixed outer raceways forming inner and outer bearing races characterized by intersecting contact angles, said apparatus comprising: a base, locating means supported from said base for engagement with an inner raceway and an outer raceway to relatively position the races in accordance with the dimensional characteristics of the engaged raceways, a first gauging component on said base for engaging the other raceway of the inner race and positioned thereby, a second gauging component on said base for engaging the other raceway of the outer race and positioned thereby, and gauging means cooperating between the gauging components responsive to the dimensional characteristics of the raceways.

3. An apparatus for gauging the mean ball space between the raceways of a double-row ball bearing having a pair of inner raceways and a pair of outer raceways forming inner and outer bearing races characterized by intersecting contact angles, said apparatus comprising a base, means in said apparatus carried from said base for engagement with one raceway of an outer race and a cooperating raceway of an inner race to relatively position the races in accordance with the dimensional characteristics of the engaged raceways, a first gauging means carried from said base for engaging the other raceway of the inner race and positioned thereby in accordance with the dimensional characteristics of both inner raceways and the axial distance therebetween, a second gauging means carried from said base for engaging the other raceway of the outer race and positioned thereby in accordance with the dimensional characteristics of both outer raceways and the axial distance therebetween, and means cooperating between the first and second gauging means responsive to their relative positions when in engagement with the bearing raceways.

4. An apparatus for gauging the mean ball space between the raceways of a double-row ball bearing having a pair of inner raceways and a pair of outer raceways forming inner and outer bearing races characterized by intersecting contact angles, said apparatus comprising: a base, means on said base for supporting the inner and outer bearing races in spaced coaxial relationship for gauging, locating means on said base carried between the inward end faces of said races, said locating means including opposed contacts for engagement respectively with an outwardly disposed raceway of an inner race and the cooperating inwardly disposed raceway of an outer race to relatively position the races in accordance with the dimensional characteristics of the engaged raceways, opposed gauging means, means on said base carrying said opposed gauging means outwardly of the respective races and for relative movement inward toward one another along the axis of the supported races, said gauging means including inwardly disposed contacts for engagement with the inward raceway of the inner race and the outward raceway of the outer race respectively, actuating means operatively connected to said gauging means for relative inward movement thereof into contact with the respective bearing raceways and to limited relative positions as determined by the raceway characteristics, and means in said apparatus responsive to the relative positions of the gauging means.

5. An apparatus for gauging the mean ball space between two cooperating pairs of raceways of a double-row ball bearing, said apparatus comprising: a base, locating means carried from said base including freely rotatable ball contacts for engaging one cooperaitng pair of raceways, a first gauging means carried from said base and including freely rotatable ball contacts for positioning engagement with the other raceway of the inner race, a second gauging means carried from said base and including freely rotatable ball contacts for positioning engagement with the other raceway of the outer race, and means cooperating between said first and second gauging means responsive to the relative disposition therebetween when so positioned.

6. An apparatus for gauging the mean ball space between the raceways of a double-row ball bearing having a pair of relatively fixed inner raceways and a pair of relatively fixed outer raceways forming inner and outer bearings races characterized by intersecting contact angles, said apparatus comprising a base, means in said apparatus carried from said base including freely rotatable balls of nominal size for engagement with one raceway of an outer race and a cooperating raceway of an inner race at the nominal contact angle to relatively position the races in accordance with the dimensional characteristics of the engaged raceways, first and second gauging means carried from said base including freely rotatable balls of nominal size for engaging the other raceways of the inner and outer races respectively at the nominal contact angle and relatively positioned thereby in accordance with the dimensional characteristics of the pairs of inner and outer raceways and the respective axial distances therebetween, and means cooperating between the first and second gauging means responsive to their relative positions when in engagement with the bearing raceways.

7. An apparatus for gauging the mean ball space between the raceways of a double-row ball bearing having a pair of inner raceways and a pair of outer raceways forming inner and outer bearing races characterized by intersecting contact angles, said apparatus comprising: a base, locating means carried on said base for engagement with a first cooperating pair of bearing raceways, a first gauging means for positioning engagement with the other raceway of the inner race, a second gauging means for positioning engagement with the other raceway of the outer race, means cooperating between and responsive to the relative positions of the first and second gauging means and comprising means providing an air leakage orifice positioned by one of the gauging means and an opposed orifice controlling surface responsive to the position of the other of the gauging means, and means connected to said air leakage orifice adapted for connection to a source of air under pressure and an air gauge.

8. An apparatus for gauging the mean ball space between the raceways of a double-row ball bearing having a pair of inner raceways and a pair of outer raceways forming inner and outer races characterized by intersecting contact angles, said apparatus comprising a base, means in said apparatus carried from said base for engagement with one raceway of an outer race and a cooperating raceway of an inner race at the nominal contact angle to relatively locate the races in a direction axially of both races in gauging position, a first gauging means carried from said base and movable thereon relative to said locating means in a direction axially of both races for engaging the other raceway of the inner race at the nominal contact angle and positioned thereby, a second gauging means carried from said base and movable thereon relative to said locating means in a direction axially of both races for engaging the other raceway of the outer race at the nominal contact angle and positioned thereby, and means cooperating between the first and second gauging means responsive to their relative positions when in engagement with the bearing raceways.

9. An apparatus for gauging the mean ball space between two cooperating pairs of raceways of a double-row ball bearing, said apparatus comprising: a base, locating means carried from said base including freely rotatable ball contacts for engaging one cooperating pair of raceways, first and second gauging means carried from said base, each including freely rotatable ball contacts for positioning engagement with the other raceway of the inner and outer races respectively, means providing an air leakage orifice in said apparatus positioned by one of said gauging means, an opposed orifice controlling surface positioned by the other, and means connected to said air leakage orifice adapted for connection to a source of air under pressure and an air gauge.

10. An apparatus for gauging the mean ball space between two cooperating pairs of raceways of a double-row ball bearing, said apparatus comprising: a base, locating means carried from said base including freely rotatable ball contacts for engaging one cooperating pair of raceways, a first gauging means carried from said base including freely rotatable ball contacts for positioning engagement with the other raceway of the inner race, a second gauging means carried from said base and including freely rotatable ball contacts for positioning engagement with the other raceway of the outer race, ball retaining means in said apparatus for each of said freely rotatable balls, each of said retaining means providing an inclined cam surface at the side of the ball remote from the raceway with which it cooperates for camming the rotatable ball into gauging contact with the raceway at the nominal contact angle, and means cooperating between said first and second gauging means responsive to their relative disposition when in gauging contact with the bearing raceways.

11. An apparatus for gauging the mean ball space between two cooperating pairs of raceways of a double-row ball bearing, said apparatus comprising: a base, locating means carried from said base including freely rotatable ball contacts for engaging one pair of cooperating raceways, first and second gauging means carried from said base, each including freely rotatable ball contacts for engagement with the other raceway of the inner and outer races respectively, retaining means in said locating means and said gauging means for retaining the freely rotatable balls, said retaining means comprising a ball receiving pocket for each ball, a retractable retaining means for engaging and retaining each ball in its respective pocket when the apparatus is not active in gauging and operable upon engagement with an end face of a bearing race to release the associated ball and allow its movement into gauging contact with the raceway, and gauging means cooperating between the first and second gauging means responsive to the relative disposition therebetween when in gauging contact with the bearing raceways.

12. In a device for gauging a bearing raceway having a nominal contact angle which is oblique to the axis of the race, in combination, a gauging unit, a plurality of raceway engaging balls, said gauging unit including retaining means for said balls carrying the balls in spaced relationship for engaging the raceway, said retaining means providing a ball receiving pocket for each of the balls, and a separate independently retractable means for each ball for retaining the ball in its pocket when the unit is inactive in gauging, means supporting a race to be gauged and said gauging unit for relative movement axially of the race, each of said retractable means having a portion for engaging the adjacent end of the bearing race and retractable thereby to allow extension of the balls into engagement with the bearing raceways.

13. In a device for gauging a bearing raceway having a nominal contact angle which is oblique to the axis of the race, in combination, a gauging unit, a plurality of raceways engaging balls, said gauging unit including retaining means for said balls carrying the balls in spaced relationship for engaging the raceway, said retaining means providing a ball receiving pocket for each of the balls, means for engaging the outer surface of each ball to retain the ball within the pocket when the unit is inactive in gauging, means supporting the gauging unit and a race to be gauged for relative movement along the race axis, each of said ball receiving pockets being of a variable radial depth having an inner surface perpendicular to the nominal contact angle, the maximum pocket depth allowing the associated ball to pass over a shoulder of the race and into the plane of the raceway to be gauged, and plunger means carried for entrance into each of the pockets to limit the movement of the ball beyond the raceway and restrict the balls to the shallower portions of the respective pocket, whereby the balls are brought into engagement with the raceway at the nominal contact angle and the gauging unit and the race are relatively positioned in accordance with the dimensional characteristics of the raceway.

14. In a device for gauging the cooperating dimensions of a double-row ball bearing race having relatively fixed raceways which face toward the vertex of intersecting contact angles, in combination, a base, a pair of gauging means relatively movable along the axis of a race to be gauged, a first of the gauging means including a plurality of equally spaced axially extending gauging fingers for extension across the bearing race, the second of the gauging means including a plurality of axially extending gauging fingers spaced for movement across the race in intermeshing relationship with the gauging fingers of said first gauging means, a plurality of raceway engaging balls, each of the gauging fingers including retaining means carrying one of said balls for extension across the race and into engagement with the raceway at the opposite side of the race from the respective gauging means, whereby the gauging means are relatively positioned in accordance with the dimensional characteristics of the raceways and the axial spacing therebetween.

15. The combination of claim 14 wherein each of said raceway engaging balls is of nominal size and each of the retaining means provides an inclined cam surface at the side of the associated ball remote from the raceway for urging the ball into engagement with the raceway, said cam surface being perpendicular to the nominal contact angle of the race.

16. The combination of claim 14 wherein each of the retaining means includes retractable means for engaging the outer surface of the respective ball to retain the ball when the gauging means are expanded and inactive in gauging, and operative upon inward movement of the respective gauging means to engage the adjacent end face of the bearing race and retract to allow extension of the ball into engagement with the bearing raceway.

17. An apparatus for gauging the mean ball space between two cooperating pairs of raceways of a double-row ball bearing, said apparatus comprising: a base, means supporting the inner and outer bearing races from said base in spaced coaxial relationship, locating means, means carrying said locating means on said base in alignment between the facing inward faces of the races, whereby one inner raceway and one outer raceway are situated inward and adjacent the locating means and one outer raceway and one inner raceway are situated outward and remote from said locating means, said locating means including freely rotatable ball contacts at one end thereof for engagement with the inwardly disposed outer raceway, said supporting means including means at said one end of the locating means for supporting an outer race in gauging position and for axial sliding, a plurality of axially extending, relatively spaced fingers at the other end of said locating means, a ball contact for each of said fingers, each finger including means for retaining the respective ball contact for free rotation and for engagement with the outwardly disposed raceway of the inner race, a first gauging means carried for axial movement on said base and including freely rotating ball contacts for engagement with the outwardly disposed raceway of the outer race, a second gauging means carried at the other end of said base and for axial movement thereon, said second gauging means including a plurality of axially extending fingers relatively spaced for movement in between the fingers of the locating means, each of the fingers of said second gauging means including a freely rotatable ball contact and means retaining the ball contact and carrying it for engagement with the inwardly disposed raceway of the inner race, said supporting means further including axial extensions on the lowermost pair of fingers of the second gauging means forming a support for the inner bearing race during loading and gauging, means operatively connected to said first and second gauging means for inward movement to gauging positions, and means cooperating between first and second gauging means responsive to the mean ball space between the raceways.

18. An apparatus for gauging the mean ball space between two cooperating pairs of raceways of a double-row ball bearing, said apparatus comprising: a base, means supporting the inner and outer bearing races from said base in spaced coaxial relationship, locating means, means carrying said locating means on said base in alignment between the facing inward faces of said races, whereby one inner raceway and one outer raceway are situated inward and adjacent the locating means and one outer race and one inner raceway are situated outward and remote from said locating means, said locating means including freely rotatable ball contacts at one end thereof for engagement with the inwardly disposed outer raceway, a plurality of axially extending, relatively spaced fingers at the other end of said locating means, a ball contact for each of said fingers, each finger including means for retaining the respective ball contact for free rotation and for engagement with the outwardly disposed raceway of the inner race, a first gauging means carried for axial movement on said base and including freely rotatable ball contacts for engagement with the outwardly disposed raceway of the outer race, a second gauging means carried at the other end of said base and for axial movement thereon, said second gauging means including a plurality of axially extending fingers relatively spaced for movement in between the fingers of the locating means, each of the fingers of said second gauging means including a freely rotatable ball contact and means retaining the freely rotatable ball contact and carrying it for engagement with the inwardly disposed raceway of the inner race, means cooperating between the second gauging means and the adjacent end of the locating means operative upon intermeshing movement of the ball rotating fingers to engage and urge the balls into gauging contact with the raceway of the inner race, and means cooperating between said first and second gauging means for gauging their relative dispositions in response ot the mean ball space between the raceways.

19. An apparatus for gauging the mean ball space between the raceways of a double-row ball bearing having a pair of relatively fixed inner raceways, and a pair of relatively fixed outer raceways forming inner and outer bearing races characterized by intersecting contact angles, said apparatus comprising: a base, locating means supported from said base having freely rotatable ball contacts for engagement with an inner raceway and an outer raceway to relatively position the races in accordance with the dimensional characteristics of the engaged raceways, a first gauging component on said base having freely rotatable ball contacts for engaging the other raceway of the inner race and positioned thereby, a second gauging component on said base having freely rotatable ball contacts for engaging the other raceway of the outer race and positioned thereby, and gauging means cooperating between the gauging components responsive to the dimensional characteristics of the raceways.

References Cited in the file of this patent

UNITED STATES PATENTS

| | | |
|---|---|---|
| 1,550,671 | Brault | Aug. 25, 1925 |
| 2,665,496 | Wynne | Jan. 12, 1954 |

FOREIGN PATENTS

| | | |
|---|---|---|
| 138,903 | Sweden | Jan. 27, 1953 |